(No Model.)

F. B. KENDALL.
COMBINED WHEELBARROW AND SLED.

No. 299,798. Patented June 3, 1884.

WITNESSES:
Gustave Dieterich
C. Sedgwick

INVENTOR:
F. B. Kendall
BY Munn & Co
ATTORNEYS.

N. PETERS, Photo-Lithographer, Washington, D. C.

UNITED STATES PATENT OFFICE.

FRANKLIN B. KENDALL, OF TUMWATER, WASHINGTON TERRITORY.

COMBINED WHEELBARROW AND SLED.

SPECIFICATION forming part of Letters Patent No. 299,798, dated June 3, 1884.

Application filed March 8, 1884. (No model.)

*To all whom it may concern:*

Be it known that I, FRANKLIN B. KENDALL, of Tumwater, in the county of Thurston and Territory of Washington, have invented a new and Improved Combined Sled and Wheelbarrow, of which the following is a full, clear, and exact description.

This invention consists in certain novel constructions and combinations of parts in a wheelbarrow, whereby the same may be readily converted into a sled or back again into a wheelbarrow, and a cheap, strong, and convenient structure is obtained for either article or vehicle, substantially as hereinafter described.

Reference is to be had to the accompanying drawings, forming a part of this specification, in which similar letters of reference indicate corresponding parts in all the figures.

Figure 1:
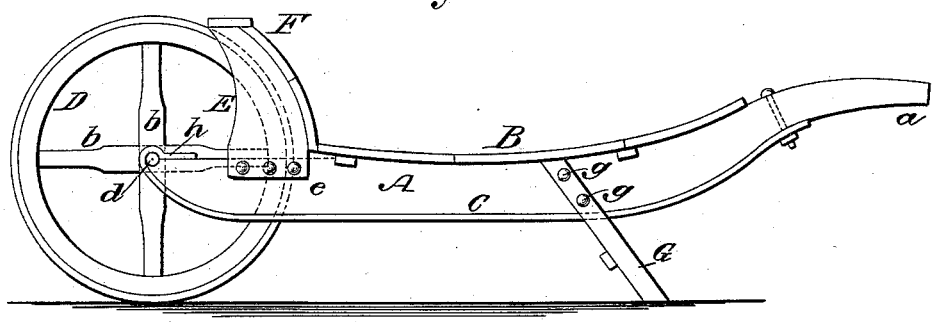
Figure 2:
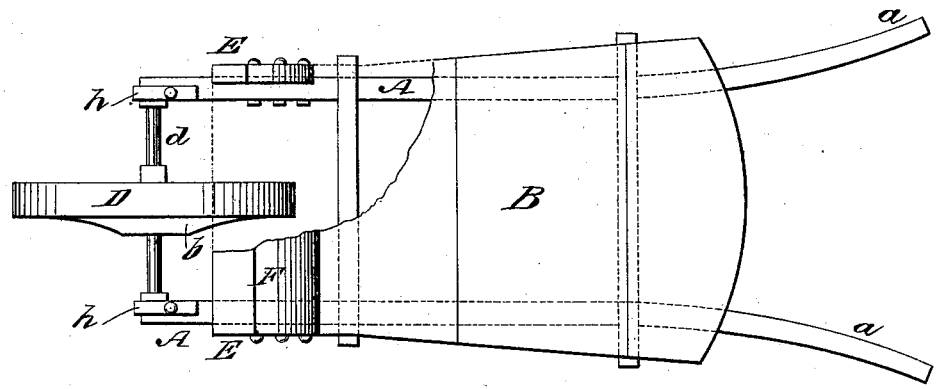
Figure 4:
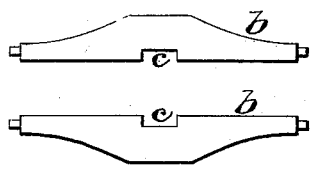
Figure 3:
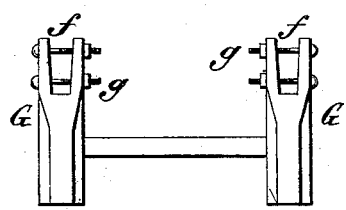

Figure 1 represents a side view of a wheelbarrow embodying my invention and constructed so as to be readily convertible into a sled. Fig. 2 is a partly-broken plan view of the same; Fig. 3, an end elevation of the legs of the barrow detached; and Fig. 4, a longitudinal view of the spokes of the wheel of the barrow detached.

A A are the sides of the wheelbarrow constructed to run either end forward when the vehicle is converted into a sled, and made as narrow as practicable to adapt them to a sled. The upper margins of said sides are made slightly concave, whereby wood is economized, and increased strength is obtained when the top or cover B is secured or properly screwed down to its place, and the shoes of iron or runners C are fastened to their places. These sides A A may be made of any light wood and of the desired shape (including the handles $a\ a$, which are extensions of them) either by steaming and bending, sawing, or otherwise.

D is the wheel of the barrow, having spokes $b\ b$, arranged to cross each other at right angles. These spokes at their ends have the same thickness as the fellies, but are much wider at their center where the bearing is on the axle, and are locked with one another by scores $c\ c$ cut in each spoke, and of half the thickness of the fellies. Said wheel should be made of hard wood, and after the spokes $b\ b$ have been fitted together, as described, a hole is bored in the center of them for the axle $d$. This construction of the wheel, while being cheap and giving great strength and a good-sized hub, admits of its being readily removed when converting the wheelbarrow into a sled. The axle $d$ is made of round iron, to admit of its being used as a roller for a tongue to move the sled backward and forward, said tongue being made with a hole in or near its inner end to fit the axle, and a split in it extending from said end through and beyond said hole, to spring the tongue on to the axle, after which it may be fastened by a screw-bolt.

Back of the wheel D, on the sides of the wheelbarrow, are two uprights, E E, which are shouldered down to fit said sides, and have lips $e$ extending down the sides and receiving bolts through them, to secure the uprights to the sides. These uprights which may be connected by a cross hood-piece, F, serve to hold the sides in place. The same may or may not be removed when using the vehicle as a sled.

G G are the legs of the wheelbarrow, which have a slot, $f$, in their tops, to receive the sides of the barrow within them, the runners C resting on the lower walls of the slots, and bolts $g$, passing through the slotted ends of the legs and sides of the barrow, to hold the legs in place. This construction and manner of attaching the legs is strong and admits of the ready removal of the legs when using the vehicle as a sled.

The boxes $h$ for the axle $d$ are made by welding an extension on the shoes or runners, and secured by screws on the top of the sides over which they lap.

For a given weight of material used in construction this barrow, incased in iron, as described, will carry a much greater weight than a barrow of ordinary construction.

Having thus described my invention, I claim as new and desire to secure by Letters Patent—

1. In a combined or convertible sled and wheelbarrow, the sides A A of the barrow, constructed to run either end foremost when converting the vehicle into a sled and provided with metal shoes or runners C, in combination with the removable wheel D of the barrow, and detachable legs G G, substantially as specified.

2. The detachable legs G G of the barrow, constructed with an upper slot, $f$, in combination with the sides A A of the wheelbarrow, having metal runners or shoes C, substantially as and for the purpose described.

3. The combination, with the sides A A, having runners C, of the uprights E, and cross hood-piece F, essentially as shown and described.

FRANKLIN B. KENDALL.

Witnesses:
C. F. EASTMAN,
FRANK E. RICE.